No. 890,821. PATENTED JUNE 16, 1908.
H. M. TILESTON.
EYE GUARD.
APPLICATION FILED JUNE 16, 1906.
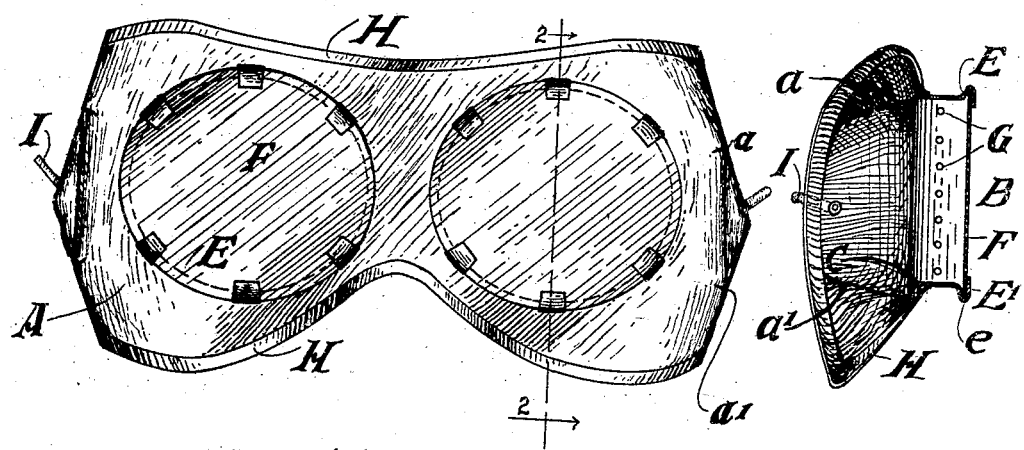
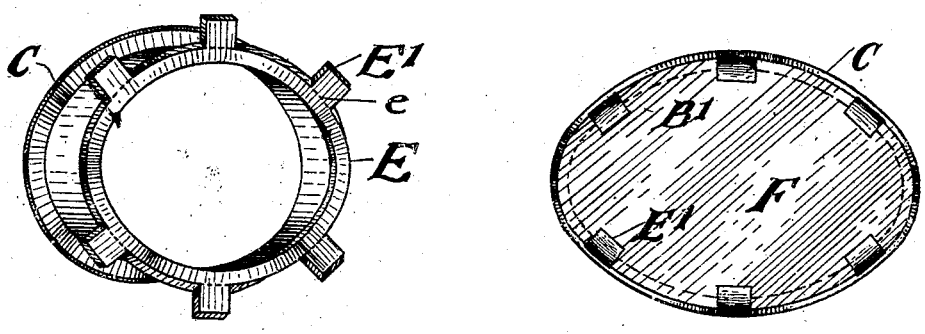
Witnesses.
W. C. DeLong
C. A. Adams
Inventor:
Henry Merrill Tileston
per
Charles Turner Brown,
Attorney.

UNITED STATES PATENT OFFICE.

HENRY MERRILL TILESTON, OF CHICAGO, ILLINOIS.

EYE-GUARD.

No. 890,821.         Specification of Letters Patent.         Patented June 16, 1908.

Application filed June 16, 1906. Serial No. 321,975.

*To all whom it may concern:*

Be it known that I, HENRY MERRILL TILESTON, a citizen of the United States, and a resident of Chicago, in the county of Cook and State of Illinois, have invented certain new and useful Improvements in Eye-Guards, of which the following, when taken in connection with the drawing accompanying and forming a part hereof, is a full and complete description, sufficient to enable those skilled in the art to which it pertains to understand, make, and use the same.

This invention relates to eye guards used to protect the eyes and adjacent portions of the face from particles of dust, snow, hail and the like. And the object of the invention is to obtain an eye guard which is collapsible, of which the lenses are not easily broken, but easily replaced when broken, which will conform to the features of the face with the lenses thereof raised to stand out from the face, and curved or flat as preferred, which permits the lenses thereof to be taken therefrom and different lenses substituted therefor by one not especially skilled in the art, which presents a pleasing appearance, which is durable, not liable to get out of order, and which can be economically made.

This invention is embodied in the constructions illustrated in the drawing referred to, in which Figure 1 is a front elevation of an eye guard. Fig. 2 is a vertical sectional view of the eye guard illustrated in Fig. 1, on line 2—2 of Fig. 1, viewed in the direction indicated by the arrows. Fig. 3 is a perspective view of a metal ring forming an element in the eye guard embodying this invention, with the lenses of the eye guard removed. Fig. 4 is a front elevation of a modification of the ring illustrated in Fig. 3, with a lens secured in place therein.

A reference letter applied to designate a given part is used to indicate such part throughout the several figures of the drawing wherever the same appears.

A is the frame of the eye guard and is provided with the apertures which are closed, by the lenses of the eye guard; and such frame is also provided with slits at the several corners thereof, the edges adjacent to such slits being overlapped, as at *a*, *a'*, in the ordinary way. As is shown in the drawing the lenses in this eye guard stand out and forward from the frame A in such manner that the raising of the frame by the slits or overlappings *a*, *a'*, is augmented to a considerable extent, and for that reason very flexible material, as leather or cloth, as well as wire gauze, may be used in the construction of such frame and the manner in which the lenses are secured in place permits removal of the lenses when desired. Such raising of the frame by the slits and overlappings, as described, produces a flat body portion in which are located the apertures through which the rings of soft metal hereinafter described are inserted, and the edges of the frame are in contact with the features of the wearer in a different plane from that of the main body portion.

B is a ring formed up of soft metal with the flaring flange C at one edge thereof and the outwardly extending flange E with projections E', E', at the other edge thereof. Projections E', E', are respectively bent over on lines *e*, *e*, to hold the lenses in place.

F, F, are the lenses of the eye guard and may consist of glass, mica or other suitable material. Such lenses are held in place in the rings (B, B,) by the outward flange E and projections E', E', bent over on the lenses, as is well illustrated in Figs. 1, 2, and 4 of the drawing.

The ring B is provided with apertures G, G, when desired, for ventilation, but where this eye guard is used to protect the eyes from noxious gases, as it may well be, such apertures G, G, are not used.

H is the binding of frame A and is made of flexible material such as cloth, leather or the like.

The apertures in frame A are made slightly smaller in diameter than is the diameter of the ring B and thereby such ring is held in such frame A by frictional engagement with the edges of the apertures.

Ring B is shown in Figs. 1, 2 and 3 as substantially cylindrical; but the same may be made oval in shape as is illustrated in Fig. 4, and I have so made them. The oval shape ring is lettered B'.

I, I, are cords attached to the flexible frame A to maintain the eye guard in place on the face of the wearer, and may be made of elastic cord, if preferred.

The ring B (or B') being made of soft metal, as hereinbefore stated, is of small cost, and in case of breakage of the lenses held therein such broken lenses and the rings holding them, (or either of them) may be thrown aside and new lenses in new rings substituted therefor, or the projections E', E', may be bent out sufficiently to insert new lenses, and again closed over the lens.

To assemble this eye guard the frame A is first made with the slits and overlappings a, a', therein, with the binding H thereon, and provided with apertures for the lenses and rings B, B. The lenses F, F, are secured in the rings B (or B'), by flanges E and projections E', E', and the flange C is made on such rings. The frame A is then drawn over the flanges E, E, and after being so drawn thereover the edges of the apertures for the lenses will lie closely to the ring B (or B'), such apertures being as stated, slightly smaller than the rings.

In practice it is found that a certain movement of the rings B, B, in the apertures therefor occurs, particularly when the lenses or the flanges E, E, of the rings B, B, are hit by small flying objects, and that the protection afforded the lens by such movement and by the flanges E, E, and projections E', E', protects, to a considerable degree, such lenses from breakage. The flange C is deeper than the flanges E, E, to prevent ring B coming out of frame A, when in use. It will be seen that by this construction I obtain what may be termed a double set out of the lenses from the face of the wearer.

Having thus described my invention what I claim as new and desire to secure by Letters Patent is—

1. In an eye guard the combination of a flexible frame comprising a flat body portion lying in one plane and a bulging portion the edges of which are in a different plane from the body portion, such body portion being provided with apertures with rings respectively provided with outwardly extending flanges at each end thereof, lenses, and means for securing the lense to the outwardly extending flanges of the rings, each ring being arranged to be held in one of the apertures in the frame by frictional engagement within its aperture.

2. In an eye guard, a frame of flexible material provided with apertures for carrying rings on which rings are mounted lenses, and such frame provided with slots and overlappings at the corners to make the frame adjacent to the apertures for the rings stand out from the face, rings provided with outwardly extending flanges at the edges thereof, lenses in the rings, means to hold a lens at one end of a ring, the apertures in the frame fitting over the rings to cause the rings to protrude beyond the frame; substantially as described.

HENRY MERRILL TILESTON

In the presence of—
 CHARLES TURNER BROWN,
 CORA A. ADAMS.